FREQUENCY SHIFT CONVERTER MARK RESTORER CIRCUIT

Filed Nov. 19, 1962

RICHARD E. DANIEL
INVENTOR.

BY M. Jabin

ATTORNEY

United States Patent Office 3,164,773

Patented Jan. 5, 1965

3,164,773

FREQUENCY SHIFT CONVERTER MARK RESTORER CIRCUIT

Richard E. Daniel, Rollings Hill, Calif., assignor to Hoffman Electronics Corporation, a corporation of California Filed Nov. 19, 1962, Ser. No. 238,434
10 Claims. (Cl. 325—320)

The present invention relates to frequency modulation systems of the binary, frequency shift teletype variety; and it relates more particularly to an improved restorer circuit for use in such a system.

As is well known, teletype communication is usually carried out by means of a binary telegraphic code. A radio-frequency carrier is shifted to a first selected frequency for the "mark" character of the binary code and to a second selected frequency for the "space" character of the code. The mark frequency may be considered to be the upper frequency and the space frequency may be considered to be the lower frequency.

After detection at the teletype receiving station, the upper, or mark frequency, is converted to a unidirectional signal of a first polarity; and the lower, or space frequency, is converted to a unidirectional signal of the opposite polarity. For instance, a detected mark signal may be represented by a positive potential and the detected space signal may be represented by a negative potential. Of course, these polarity relationships are merely by way of example, and they can be vice versa. For the purpose of the present description, however, it will be assumed that the detected mark signal is a positive potential, and that the detected space signal is a negative potential.

When the receiving station is properly tuned, the amplitude of the positive detected mark pulses at the frequency modulation detector output is equal to the amplitude of the negative detected space pulses. However, should the tuning of the transmitter or of the receiver drift, the equal-amplitude relationship between the mark and space pulses at the detector output no longer exists.

In order to restore the above-mentioned amplitude equality between the mark and space pulses, it is usual for the prior art receivers to include an axis restorer circuit of appropriate type. The prior art axis restorer circuit, however, requires a series capacitor in its input coupling network.

When the transmitting station of the teletype system is not sending out a message, it is usual for it to transmit the carrier continuously at the mark frequency, and to hold the carrier at the mark frequency until the next message is commenced. Then, when the transmitter sends out the constant mark frequency carrier between messages, the capacitor in the axis restorer circuit charges up and the output of the axis restorer circuit drops to the reference level.

The receiving station of the teletype system responds to the constant inter-message mark frequency carrier to develop a constant unidirectional potential at the detector of a plurality and magnitude corresponding to the mark signal. As a consequence of the alternating current coupling used in the subsequent stages of the receiving system, when the constant unidirectional mark potential is developed by the detector between messages, the coupling capacitor in the alternating current coupling network does not pass this voltage and the output of the receiving system drops to zero.

During the quiescent inter-message state of the prior art teletype receiving station, as described in the preceding paragraph, even though the coupling capacitor does not pass the unidirectional mark potential, it readily passes any alternating current noise signals which may be picked up by the receiver. These noise signals are passed, even though they may have a relatively low amplitude level. Should the noise signals cause the amplitude of the output of the receiver to cross the reference axis, the associated teleprinter in the receiving station is caused to print out a random garbled copy.

It is an object of the present invention, therefore, to provide a novel frequency shift keying mark restorer circuit.

It is another object of the present invention to provide an improved network for use in a receiving station of a teletype system which serves to prevent noise signals, received during the quiescent inter-message state of the system, from spuriously actuating the teleprinter output device in the receiving station.

The improved restorer circuit of the present invention responds to the constant amplitude mark potential produced by the frequency modulation detector of the receiving system to produce an artificial mark voltage. This artificial mark voltage is applied to a receiver stage which is subsequent to the axis restorer circuit described above.

The improved restorer circuit of the present invention also responds to the first space character of a subsequent message from the transmitting station, to remove the artificial mark voltage from the subsequent receiver stage. Upon the termination of the message, however, the reception of the constant frequency mark carrier from the transmitter causes the circuit of the invention to restore the artificial mark voltage at the subsequent receiver stage.

The above-mentioned noise signals received by the receiving station are then capable of producing a spurious teleprinter reading only if the output corresponding to such signals crosses the reference axis of the receiver output stage. The presence of the artificial mark voltage produced by the restorer circuit of the present invention prevents the noise signal output from crossing the reference axis. So long as the artificial mark voltage is produced and applied to the subsequent receiver stage, the received noise signals are incapable of producing a spurious control of the teleprinter under normal circumstances.

Other objects and advantages of the invention will become apparent from a consideration of the following description; when the description is taken in conjunction with the accompanying drawing, in which.

Figure 1:
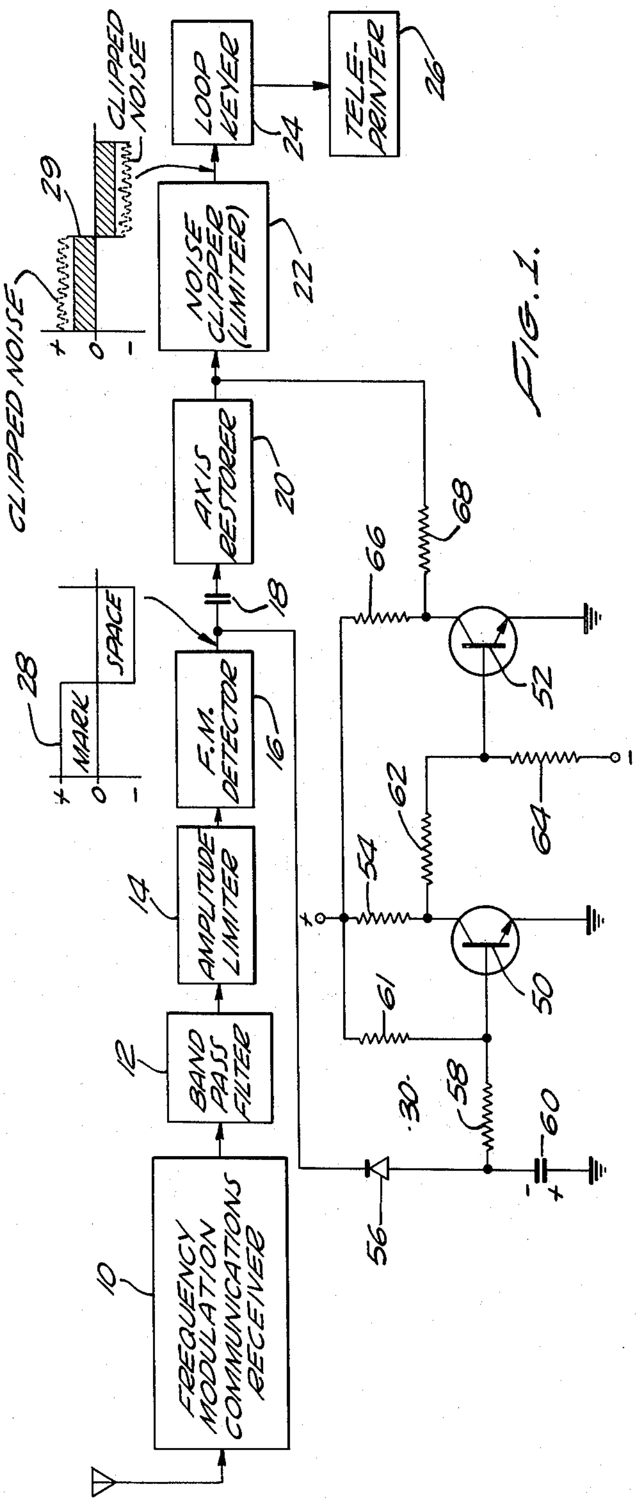
FIGURE 1 is a schematic diagram, partly in block form and partly in circuit form, illustrating a teletype receiver incorporating one embodiment of the restorer circuit of the present invention.

The teletype receiving system of FIGURE 1 includes a usual frequency modulation communications receiver 10. The output of the receiver 10 is coupled through a band-pass filter 12 to an amplitude limiter 14. The amplitude limiter 14 is coupled to a frequency modulation detector 16 which, in turn, is coupled through a capacitor 18 to an axis restorer circuit 20. The axis restorer circuit is coupled to a noise clipper (limiter) stage 22 which, in turn, is coupled to a usual loop keyer 24. The output from the loop keyer 24 is coupled to a teleprinter 26 of any known type.

The receiver stages described above represent the usual stages of the conventional prior art teletype receiving system. The individual circuit for each of the stages is extremely well known to the art, and for that reason, it is believed unnecessary to describe or show such circuits in detail. It should also be pointed out that any appropriate known circuit may be used for the individual receiver stages described above, and that such circuits form no part of the present invention.

As mentioned above, the teletype frequency shift keying technique is a form of binary frequency modulation. The transmitting station of the teletype system transmits a message by shifting a carrier between a first selected frequency and a second selected frequency. The frequency modulation communication receiver at each receiving station is tuned to receive these two carrier frequencies; and it produces both frequencies, heterodyned to an audio frequency range, at its output. The output of the frequency modulation communication receiver 10 is filtered in the band-pass filter 12 to obtain the desired band of frequencies. The output from the band-pass filter 12 is then fed to the amplitude limiter 14 to obtain a constant output, and to eliminate fading. The output from the amplitude limiter 14 is appled to the frequency modulation detector 16.

When the transmitting station of the teletype system is sending a message, a train of positive and negative mark and space detected pulses is developed at the output of the frequency modulation detector 16. These pulses are indicated, for example, by the curve 28 in FIGURE 1. When the received carrier from the transmitting station is tuned in properly, the magnitude of the positive mark pulses is equal to the magnitude of the negative space pulses. As mentioned above, however, when the transmitter or receiver tuning drifts, this equal amplitude relationship is no longer true.

In order to restore the center axis of the detected mark and space pulses, the axis restorer circuit 20 is included in the teletype receiver. This restorer circuit, as mentioned above, is known to the art, and any appropriate circuit can be used.

The teletype receiving system of FIGURE 1 is preferably designed for maximum noise immunity and for maximum immunity against fading, without causing printing errors in the teleprinter. The noise clipper (limiter) 22 clips any noise riding on top of the detected mark and space pulses, as shown by the curve 29 in FIGURE 1. The clipped pulses are then applied to the loop keyer 24, which controls the teleprinter 26 in the usual manner.

As described above, during the interval between messages, the teletype transmitter sends out a continuous mark frequency carrier. The teleprinter 26 is intended to remain locked during this interval and until the next message commences. The series coupling capacitor 18 of the axis restorer circuit 20 blocks the constant mark potential developed by the frequency modulation detector 16 during the inter-message quiescent state of the teletype system. The output from the axis restorer circuit 20, therefore, drops to the reference level during the inter-message interval.

Now, should an alternating-current noise signal be picked up during this inter-message interval, and even though the noise signal has a relatively low amplitude level, it is readily passed through the axis restorer circuit 20, and it causes the loop keyer 24 to control the teleprinter 26 in a spurious manner so as to produce a random garbled copy.

The function of the improved restorer circuit of the invention is to prevent the occurrence of a happening such as described in the preceding paragraph. As shown in FIGURE 1, the restorer circuit 30 of the invention is connected to the output of the frequency modulation detector 16, and in effect, the restorer circuit 30 provides a by-passing path for the axis restorer 20.

The restorer circuit 30 of the invention, as will be described, provides an artificial mark voltage at the output of the axis restorer 20 which extends above the reference axis. This artifical mark voltage serves to lift any noise signals up from the reference axis, so that such noise signals, unless they have an extremely high amplitude, are incapable of crossing the axis and of producing a spurious operation of the teleprinter 26.

Figure 2:
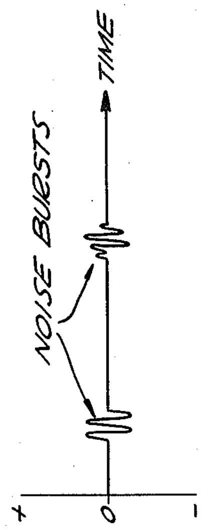
FIGURE 2 shows the axis relationship of noise signals which may be received by a prior art teletype receiver which is not equipped with the improved restorer circuit of the invention.

The transmission of alternating current noise through the usual prior art receiver is shown in FIGURE 2. It will be seen that without the restorer circuit 30 of the present invention, these noise signals appear on the reference axis at the output of the restorer circuit 20, and they cross the reference axis to produce an unwanted operation of the teleprinter 26. However, the presence of the artificial mark voltage produced by the restorer circuit 30, as shown in FIGURE 3, serves to lift these noise signals up from the reference axis, so that unless they have an excessively and unusually high amplitude, they cannot cross the reference axis, and they cannot normally cause a spurious operation of the teleprinter 26.

The restorer circuit 30 of the present invention includes a pair of electronic discharge devices 50 and 52. In the illustrated embodiment, these discharge devices have the form of NPN transistors. The emitter of the transistor 50 is grounded, and the collector is connected to a resistor 54, which in turn is connected to the positive terminal of an appropriate direct current exciting source. The output of the frequency modulation detector 16 is connected to the cathode of a unilateral conductive device, such as a diode 56. The anode of the diode 56 is connected to a resistor 58 and to a grounded capacitor 60. The resistor 58 is connected to the base of the transistor 50. A resistor 61 is connected to the base of the transistor 50 and to the positive terminal (+) of the direct current exciting source.

The collector of the transistor 50 is connected to a resistor 62 which, in turn, is connected to the base of the transistor 52. The base of the transistor 52 is also connected to a resistor 64 which, in turn, is connected to the negative terminal (—) of the exciting source. The emitter of the transistor 52 is grounded. The collector of the transistor 52 is connected to the junction of a pair of resistors 66 and 68. The resistor 66 is connected to the positive terminal of the direct current exciting source, and the resistor 68 is connected to the output of the axis restorer circuit.

Figure 3:
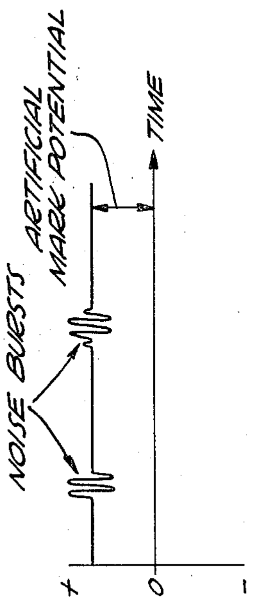
FIGURE 3 shows the axis relationship of noise signals which may be received by a teletype receiver equipped with the improved restorer circuit of the invention.

The function of the restorer circuit 30 is to substitute an artificial mark voltage at the input to the noise clipper (limiter) 22, so as to prevent the alternating current noise signals from crossing the reference axis, as was the case with the prior art receiver, as shown in FIGURE 3.

When the transmitting station of the teletype system is in the quiescent inter-message condition, so that a constant mark frequency carrier is being transmitted, the resulting positive voltage appearing at the output of the detector 16 reverse biases the diode 56. When this occurs, the positive bias applied to the base of the transistor 50 through the resistor 61 causes the transistor 50 to conduct heavily. This high conduction of the transistor 50 causes a negative bias to be applied to the base of the transistor 52 because of the potential drop across the resistors 62 and 64. This negative bias drives the transistors 52 to its cut-off condition.

The transistor 52 functions as a switching device, and it selectively causes the junction of the resistors 66 and 68 to be connected to ground. When the transistor 52 is non-conductive, it causes an artificial mark voltage to be applied to the limiter 22 through the resistors 66 and 68. This artificial mark voltage, for example, has a particular positive value with respect to the reference axis. On the other hand, when the transistor 52 is rendered conductive, it places the junction of the resistors 66 and 68 at ground potential, effectively removing the artificial mark voltage.

The polarity of the diode 56 is such that the space pulses appearing at the output of the frequency modulation detector 16 pass through the diode 56 to charge up the capacitor 60. The space pulses passed through the diode 56 during the normal message transmission maintain the capacitor 60 in a charged condition, so as to hold the transistor 50 in its non-conductive condition. So long as the transistor 50 is non-conductive, the transistor 52 is conductive, and the artificial mark voltage is removed from the input of the noise clipper (limiter) 22.

During normal transmission in the usual type of frequency shift teletype system, the detected individual mark pulses never exceed a predetermined time interval which is less, for example, than three seconds. During the inter-message intervals of the teletype system, when the continuous mark frequency carrier is being transmitted, the receipt of a detected mark pulse of a duration greater, for example, than three seconds, causes the capacitor 60 to discharge through the resistor 58 for a sufficient time to enable the positive bias applied to the transistor 50 to cause it to become conductive. This permits the transistor 52 to be controlled so as to establish the artificial mark voltage at the input of the noise clipper (limiter) stage 22.

The circuit constants of the restorer circuit 30 may have any appropriate values, so that the artificial mark voltage is turned on a few seconds after message is stopped. Of course, the time constant of the resistance-capacitance input circuit 58, 60 has to be high enough so that the capacitor will not discharge to any appreciable extent between successive space pulses when receiving a message.

When a message is transmitted by the usual present-day teletype system, the first character to be transmitted is always a space. This character is used by the restorer circuit 30 to remove the artificial mark voltage from the input of the limiter 22.

The restorer circuit 30, therefore, establishes a direct current restorer path around the alternating current coupling circuit of the axis restorer 20. The improved restorer circuit 30 of the present invention responds to the positive output from the detector 16 when the output has a duration beyond a predetermined time interval. Such a positive output beyond that time interval causes the restorer circuit 30 to establish an artificial mark voltage at the input of the noise clipper (limiter) 22. This artificial mark voltage, as shown in FIGURE 3, serves to raise the direct current level through the limiter 22 so that received alternating current noise signals of normal intensity do not cross the reference axis and, therefore, have no effect on the loop keyer 24 and teleprinter 26.

Thus, the invention provides an improved restorer circuit for use in a teletype frequency shift receiver. The restorer circuit of the invention operates in a simple and straightforward manner to prevent spurious and garbled outputs from being printed by the teleprinter 26 in response to alternating current noise signals received during the quiescent inter-message intervals of the teletype system. As mentioned above, these noise signals are clipped by the normal action of the noise clipper (limiter) 22 during the actual message intervals.

While a particular embodiment of the invention has been shown and described, modifications may be made, and it is intended in the claims to cover all such modifications as fall within the spirit and scope of the invention.

I claim:

1. Mark restorer circuit means for a frequency shift converter circuit, comprising:

(*a*) a detector for producing a series of pulses having first and second polarities with respect to a reference axis, (*b*) axis-restorer means coupled to said detector and including a series-connected capacitor.

(*c*) utilization means coupled to said axis-restorer means, and (*d*) a control circuit coupled between said detector and said utilization means and responsive to the output of said detector for supplying to said utilization means a potential of said first polarity only so long as the output of said detector has both said first polarity and a duration extending beyond a predetermined interval.

2. A frequency-shift system for receiving and reproducing an electric signal shifted between a first selected frequency and a second selected frequency in accordance with a telegraphic code, comprising:

(*a*) means including a detector for producing in response to said signal a series of pulses having first and second polarities with respect to a reference axis, (*b*) second means coupled to said detector and including a series-connected capacitor means, (*c*) utilization means coupled to said second means, and (*d*) a control circuit coupled between said detector and said utilization means and responsive to the output of said detector for supplying to said utilization means a potential of said first polarity only so long as the output of said detector has both said first polarity and a duration extending beyond a predetermined interval.

3. In a frequency-shift receiving system for receiving and reproducing an electric wave signal shifted between a first selected frequency and a second selected frequency in accordance with a telegraphic code, and which receiving system comprises means including a detector for producing in response to said wave signal a series of pulses having first and second polarities with respect to a reference axis, circuit means coupled to said detector and including a series-connected capacitor means, and utilization means coupled to said circuit means; a control circuit coupled to said detector and comprising:

(*a*) switching means coupled to the output of said circuit means for selectively establishing the potential thereof at a particular level with respect to said reference axis, and (*b*) a circuit coupled to said switching means for the actuation thereof in response to a potential appearing at the output of said detector which has a particular polarity with respect to said reference axis and which has a particular duration beyond a predetermined minimum time interval.

4. In a frequency-shift receiving system for receiving and reproducing an electric wave signal shifted between a first selected frequency and a second selected frequency in accordance with a telegraphic code and which receiving system comprises means including a frequency modulation detector for producing in response to said wave signal a series of pulses having first and second polarities with respect to a reference axis, an axis-restorer circuit coupled to said detector for maintaining amplitude equality of said pulses and including series capacitor means, and utilization means for said pulses coupled to said axis-restorer circuit; a control circuit coupled to said detector means and comprising:

(*a*) circuit means including a switching device coupled to the output of said axis-restorer circuit for selectively establishing the potential thereof at a particular level with respect to said reference axis, and (*b*) an input circuit coupled to said switching device and responsive to a potential of a particular polarity with respect to said reference axis at the output of said detector and of a duration exceeding a predetermined time interval for actuating said switching device.

5. In a frequency-shift receiving system for receiving and reproducing an electric wave signal shifted between a first selected frequency and a second selected frequency in accordance with a telegraphic code and which receiving system comprises means including a frequency modulation detector for producing in response to said wave signal a series of pulses having first and second polarities with respect to a reference axis, an axis-restorer circuit coupled to said detector for maintaining amplitude equality of said pulses and including series capacitor means, and utilization means for said pulses coupled to said axis-restorer circuit; a control circuit coupled to said detector and including:

(*a*) electronic discharge means, (*b*) a time-constant input circuit coupled to said discharge means and responsive to a potential which has a particular polarity with respect to said reference axis at the output of said detector and which has a duration exceeding a predetermined time interval, for causing said discharge means to assume a particular conductive state, and (*c*) an output circuit coupled to said discharge means for applying a particular potential level with respect to said reference axis to the output of said axis restorer circuit when said discharge means assumes said particular conductive state.

6. In a frequency-shift receiving system for receiving and reproducing an electric wave signal shifted between a first selected frequency and a second selected frequency in accordance with a telegraphic code and which receiving system comprises means including a frequency modulation detector for producing in response to said wave signal a series of pulses having first and second polarities with respect to a reference axis, an axis-restorer circuit coupled to said detector for maintaining amplitude equality of said pulses and including series capacitor means, and utilization means for said pulses coupled to said axis-restorer circuit; a control circuit coupled to said detector means and comprising:

(*a*) circuit means including a first electronic discharge device coupled to the output of said axis-restorer circuit for selectively establishing the potential thereof at a particular level with respect to said reference axis, and (*b*) a further circuit including a second electronic discharge device coupled to said first discharge device and responsive to a potential of a particular polarity with respect to said reference axis at the output of said detector and of a duration exceeding a predetermined time interval for controlling the conductivity state of said first discharge device.

7. The combination defined in claim 6 in which said further circuit includes a series-connected unilateral conductive device.

8. The combination defined in claim 6 in which said further circuit includes a resistance-capacitance time constant network to provide a time delay in the control of said first discharge device by said second discharge device.

9. In a frequency-shift receiving system for receiving and reproducing an electric wave signal shifted between a first selected frequency and a second selected frequency in accordance with a telegraphic code and which receiving system comprises means including a frequency modulation detector for producing in response to said wave signal a series of pulses having first and second polarities with respect to a reference axis, an axis-restorer circuit coupled to said detector for maintaining amplitude equality of said pulses and including a series capacitor means, and utilization means for said pulses coupled to said axis-restorer circuit; a control circuit coupled to said detector means and including:

(*a*) a first electronic discharge device, (*b*) a second electronic discharge device, (*c*) an exciting circuit coupled to said first and second discharge devices for normally maintaining said first discharge device in a first conductive state and for normally maintaining said second discharge device in a second conductive state, (*d*) an input circuit coupled to said first discharge device and responsive to a potential of a particular polarity with respect to said reference axis at the output of said detector and of a time interval greater than a predetermined duration for reversing the conductive state of said first device, (*e*) a direct current coupling circuit inter-coupling said first and second discharge devices and responsive to the reversal in the conductive state of said first device for reversing the conductive state of said second device, and (*f*) an output circuit coupling said second device to the output of said axis restorer for applying a particular potential level with respect to said reference axis to the output of said axis restorer upon the reversal of the conductive state of said second discharge device.

10. In a frequency-shift receiving system for receiving and reproducing an electric wave signal shifted between a first selected frequency and a second selected frequency in accordance with a telegraphic code and which receiving system comprises means including a frequency modulation detector for producing in response to said wave signal a series of pulses having first and second polarities with respect to a reference axis, an axis-restorer circuit coupled to said detector for maintaining amplitude equality of said pulses and including series capacitor means, and utilization means for said pulses coupled to said detector means and comprising:

(*a*) circuit means including a first transistor coupled to the output of said axis-restorer circuit for selectively establishing the potential thereof at a particular level with respect to said reference axis, (*b*) a further circuit including a second transistor coupled to said first transistor for controlling the conductive state of said first transistor, and (*c*) an input circuit coupled to said second transistor and including a series-connected unilateral conductive device and a resistance-capacitance time constant network, said input circuit being responsive to a potential of a particular polarity with respect to said reference axis at the output of said detector and of a duration exceeding a predetermined time interval for controlling the conductive state of said second transistor.

No references cited.